March 19, 1957 F. C. WILLIAMS ET AL 2,785,855

ELECTRICAL STORAGE APPARATUS

Filed Nov. 24, 1950 4 Sheets-Sheet 1

Inventors:
F. C. Williams
T. Kilburn
G. C. Tootill
By: Moore and Hall
Attorneys

March 19, 1957 F. C. WILLIAMS ET AL 2,785,855

ELECTRICAL STORAGE APPARATUS

Filed Nov. 24, 1950 4 Sheets-Sheet 2

Inventors:
F. C. Williams
T. Kilburn
G. C. Tootill
By Moore ... Attorneys

ELECTRICAL STORAGE APPARATUS

Filed Nov. 24, 1950 4 Sheets-Sheet 3

Inventors:
F. C. Williams
T. Kilburn
G. C. Tootill
By Moore and Hall
Attorneys

ELECTRICAL STORAGE APPARATUS

Filed Nov. 24, 1950 4 Sheets-Sheet 4

Inventors:
F. C. Williams
T. Kilburn
G. C. Tootill
By Moore and Hall
Attorneys

United States Patent Office 2,785,855

Patented Mar. 19, 1957

2,785,855

ELECTRICAL STORAGE APPARATUS

Frederic Calland Williams, Timperley, Tom Kilburn, Davyhulme, Manchester, and Geoffrey Colin Tootill, Hollinwood, England, assignors to National Research Development Corporation, London, England Application November 24, 1950, Serial No. 197,238

Claims priority, application Great Britain December 1, 1949

12 Claims. (Cl. 235—61)

This invention relates to electrical storage devices of the kind comprising a cathode ray tube having an insulating screen, the cathode ray beam being caused to bombard discrete areas of the screen and thereby to generate on these areas states of electrostatic charge representative of digital information to be stored. Devices of this kind are described in U. S. Application Serial No. 790,879, filed December 10, 1947, 50,136, filed September 20, 1948, and 165,622, filed June 2, 1950, now forfeited in favor of the continuation thereof, Serial No. 353,819, filed May 8, 1953, now Patent No. 2,709,230, issued May 24, 1955, and in a paper entitled "A storage system for use with binary-digital computing machines" by F. C. Williams and T. Kilburn in the Proceedings of the Institution of Electrical Engineers, Part III, No. 40, March 1949, at pages 81–100.

The devices are primarily adapted for the storage of binary digits, in which case only two different states of charge must be capable of being produced. The two states of charge can be produced by two processes of irradiation by the cathode ray beam respectively, one of these processes comprising a first phase alone and the other a first phase followed by a second phase. A digit of one significance, say "0," is recorded as the level of charge produced upon one of the said discrete areas, which may be called a digit recording area, by a single irradiation of the area with an electron beam of suitable velocity and intensity. The digit of the alternative significance, "1," is recorded by first irradiating the area to produce the state of charge upon the digit recording area representative of "0" and then by means of a second or modifying phase of irradiation causing the state of charge upon the digit recording area to be modified to a condition representative of "1." During the second or modifying phase, as described in the earlier specifications and paper referred to, the electron beam is directed to an area which may wholly or in part coincide with, or be distinct from, the digit recording area.

When, after such recording, each digit recording area is irradiated during the first or exploratory phase of a digit writing interval, a change (sometimes negligibly small) is produced in the electrostatic charge associated with the area, the magnitude of the change depending upon the previous level of charge existing on the recording area and thus upon the digit, "0" or "1" previously recorded thereon. The net changes in the charge upon the recording surface give rise to corresponding currents flowing to a signal plate, which is capacitively coupled to the recording surface. The signal-plate current is used to present in dynamic form the digital information stored upon the recording surface and by control of the second or modifying phase of the digit interval, to regenerate the stored data or replace it by new data which may be derived by a computation process from the stored data. This regeneration or replacement of recorded data is possible by virtue of the fact that the signal derived during each exploratory irradiation of a digit recording area enables the nature of the stored digit to be determined in advance of the time by which a decision has to be made in order either to permit or to inhibit the modifying phase of irradiation and thereby to cause a "1" or a "0" to be re-recorded. The process of recording is generally referred to as "writing."

In a practical arrangement making use of these digital storage principles the initial exploratory irradiation of a digit recording area (by which the value of the digit stored on the area is read) may last for two microseconds and may result in a "well" of positive charge in a state of equilibrium being produced by secondary emission. Re-exploration of such a spot before the charge has had time to decay appreciably by leakage will not cause any appreciable change in the charge on the spot and only transient signals due to the switching on and off of the cathode ray beam will be obtained from the signal plate, and will be indicative of say "0." If the "well" of positive charge is to be modified so that when the exploratory irradiation is next applied to the spot a substantial change of charge is produced on the screen with the consequent production of a transient output from the signal plate indicative of "1," then the 2 microsecond exploratory interval is followed by the irradiation of an area adjacent to or within the digit recording area for a period of, say, 3 microseconds, secondary electrons from the adjacent or inner area passing to the recording area to reduce the "well" of positive charge thereon. It thus follows that an interval of at least five microseconds must be allocated to the treatment of each digit location in order that either digital significance may be recorded thereon, and in a practical system employed for the recording of binary-digital numbers it is found convenient to allocate a period of the order of eight microseconds to each digit so that an interval may elapse between the times allotted to successively occurring digits and, if necessary, to permit the period of 3 microseconds allotted to the second irradiation to be extended. It is convenient in such a system to express each "1" digit dynamically as a pulse which commences when the digit significance is detected during the initial exploratory irradiation and which continues until the modifying irradiation ceases. Such a "1" or "dash" pulse may be approximately five microseconds in duration and may be separated by an interval of approximately three microseconds from the succeeding digit period. Digits of significance "0" will be expressed dynamically by the absence of such a "dash" pulse.

It will be apparent that when such a storage system is employed for binary-digital numbers, particularly when the numbers are represented dynamically in serial form, i. e. as a train of pulses in a single channel, the speed of dynamic representation of a number is limited by the nature of the store; whereas a digit may be identified in less than two microseconds, an interval of approximately eight microseconds may have to be allocated to each digit.

It is the object of the present invention to provide an electrical storage apparatus of the kind referred to in which the limitations upon speed of operation described above are overcome.

According to the present invention there is provided electrical apparatus for the storage of digital information comprising a plurality of storage devices of the kind set forth, wherein the time intervals allotted to the reading of the information upon the screens of the several devices are interlaced with one another, whereby digital information can be read or written at a digit repetition frequency which is a multiple of the digit repetition frequency of any one of the storage devices. The time intervals allotted to the control of the writing of new information on to the screens of the several devices may also be interlaced with one another.

The invention will be described with reference to the accompanying drawings in which.

Like components are used in each of the eight storage devices and such like components are all given the same reference but the references are followed by a number from 0 to 7 identifying the one of the eight storage devices concerned.

Figure 2:
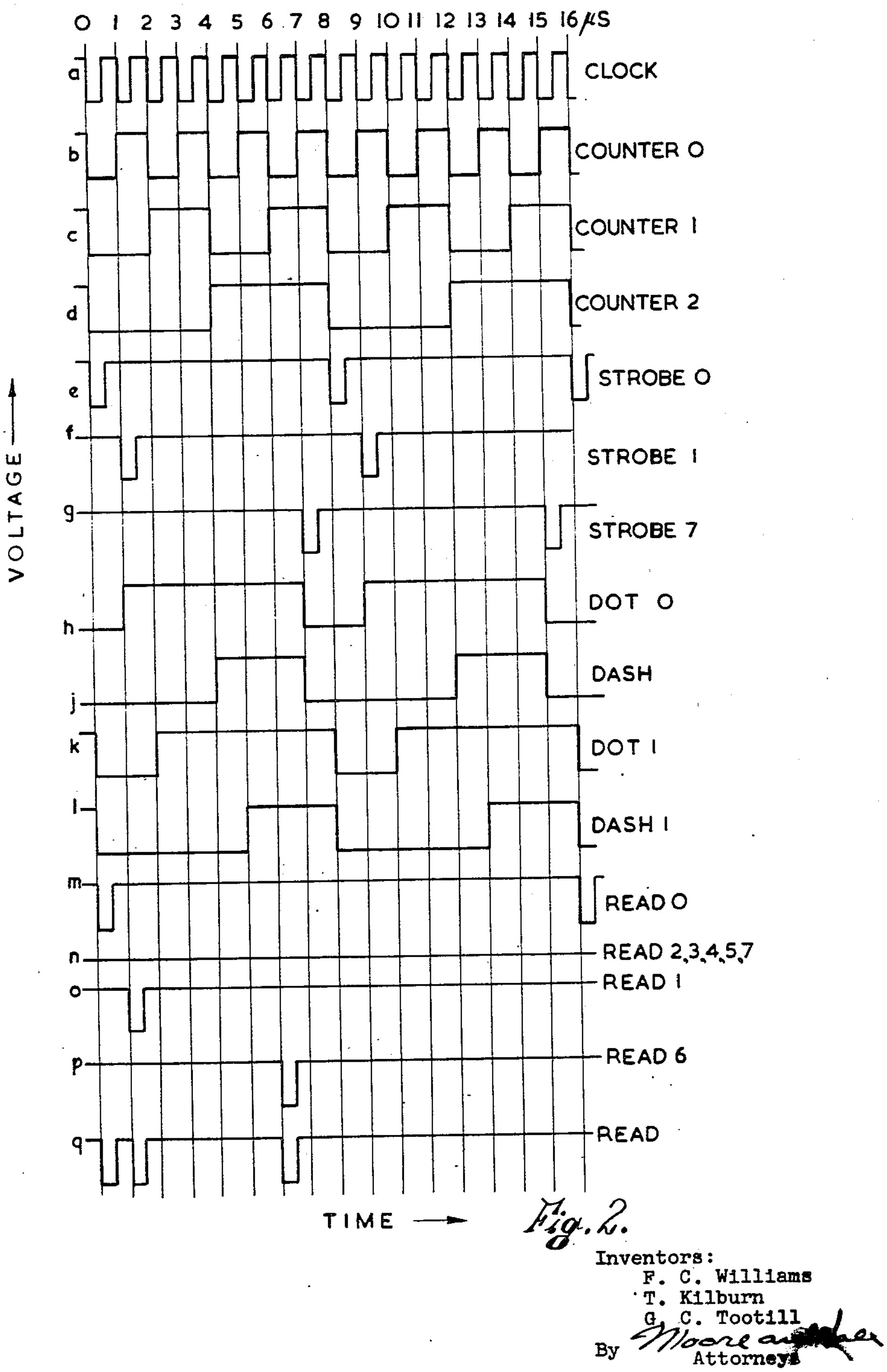
Figure 2 is a diagram of voltage waveforms which may for example be used in the circuit of Figure 1, Figures 3 and 4 are circuit diagrams of means for generating respectively the strobe and dash waveforms of Figure 2 from dot and strobe waveforms of Figure 2.

The approximate waveforms at various points in the circuit diagrams are identified by the letters of the alphabet appearing in Figure 2 alongside of the respective waveforms.

The eight storage cathode ray tubes are designated CRT0, CRT1 . . . CRT7 and each is provided with a signal pickup plate PU0, PU1 . . . PU7 and a regenerative loop circuit comprising an amplifier AMP0, AMP1, etc., a reading unit RU0, RU1, etc., and a writing unit WU0, WU1, etc. Each regenerative loop circuit may be of any of the forms described in the paper or patent specifications referred to and the minor modifications necessary will be indicated later. Examples of circuits that may be used for the elements of the loop circuit will also be given later. For the purpose of the present description it will be assumed that the "dot-dash" mode of presentation is employed in the cathode ray tube stores and that each writing unit WU0, WU1, etc. is therefore fed at terminals TO0, TA1, etc. With the dot waveforms *h, k*, etc. respectively consisting of negative-going pulses of 2 microseconds duration and at terminals TB0, TB1, etc. with the dash waveforms *j, l*, etc. respectively consisting of negative-going pulses of 5 mircoseconds duration. The dot and dash pulses have a repetition period of 8 microseconds.

As is fully explained in the earlier specifications and paper referred to, if suitable write signals to be applied at terminals TC0, TC1, etc. these will control the voltages applied to the grids of the cathode ray tubes. Thus it may be arranged that in the absence of any write signals the dot waveform *h, k*, etc. is applied (with pulses positive-going) to the grid of the corresponding cathode ray tube and that charges representing dots are then recorded on the screen of the tube. The initial parts of the signals picked up by plates PU0, PU1, etc. when these charges are explored by a cathode ray beam are characteristics of a dot and are amplified in the amplifier AMP0, AMP1, etc. and applied to a read unit RU0, RU1, etc. The voltage in the unit is strobed by the appropriate one of the waveforms *e, f* . . . *g* applied to a terminal TE0, TE1, etc. and the read output (in this case characteristic of a dot) is then obtained at a terminal TD0, TD1, etc. By "strobing" is meant selecting, for instance by means of strobe pulses, portions of a waveform occurring during the current selected time intervals.

When a suitable voltage is applied to the write terminal TC0, TC1, etc. the dot waveform is extended to the length of a dash by the dash waveform applied at TB0, TB1, etc. and the charge condition produced on the screens of the cathode ray tubes is representative of a dash. Exploring of this charge produces an initial signal characteristic of a dash and this is amplified and strobed to produce a corresponding output at TD0, TD1, etc.

Figure 1:
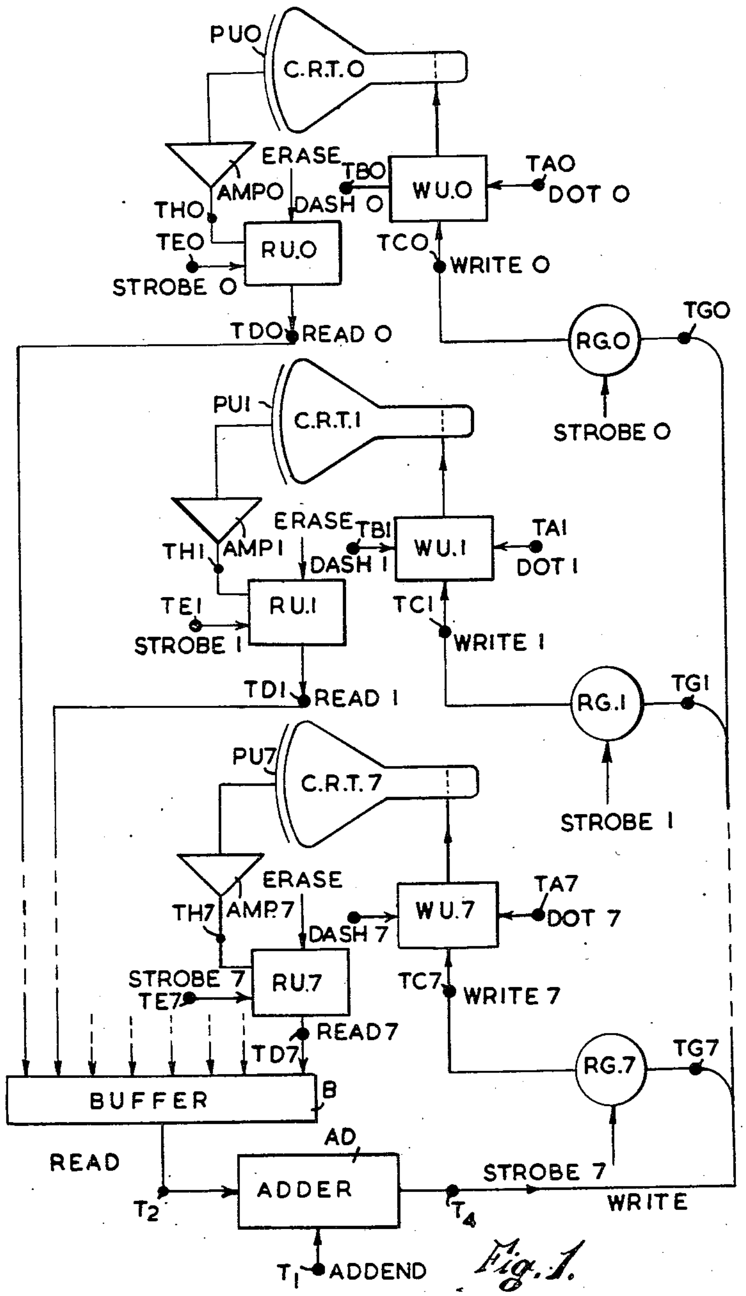
Figure 1 is a block circuit diagram of one embodiment of the invention employing eight storage devices (each including a cathode ray tube and ancillary apparatus) of which only three are shown.

The terminals TD0, TD1, etc. may be connected directly to TC0, TC1, etc. respectively if desired and regeneration of the existing charge condition on the screens then takes place. As shown in Figure 1, however, the read outputs from TD0, TD1, etc. are applied to a buffer circuit B for which a suitable circuit will be described later. It is of the character known as an "OR" gate circuit since it has the property of producing an output when an input pulse is applied to any of its input terminals.

The output from the buffer B is applied, in this example, to an adder AD which is a known circuit whereby binary information from the buffer B is added to any binary information, referred to as an addend, applied simultaneously at a terminal $T_1$. The device AD may, however, be replaced by any other computing device.

The output of the adder AD is applied as a write input to terminals TC0, TC1, etc. through writing gates RG0, RG1, etc. respectively, each of which is in the form of a conventional "and" gate circuit, so named because it produces an output only when a voltage appears simultaneously at its two or more input terminals. The inputs in this case are that from the adder AD and one of the strobe pulse waveforms *e, f* . . . *g*.

In the particular arrangement being described, the binary information is assumed to be passed from the read units RU0, RU1, etc. to the buffer B in the form of pulses of one-half microsecond duration and eight microseconds repetition period. Such a pulse may represent a dash or the digit 1 and the absence of a pulse at a given time will then represent a dot or the digit 0. The basic waveform from which all others are derived may therefore be the clock waveform *a*. This may be regarded as consisting of pulses of one-half microsecond duration and one microsecond repetition frequency.

Figure 5:
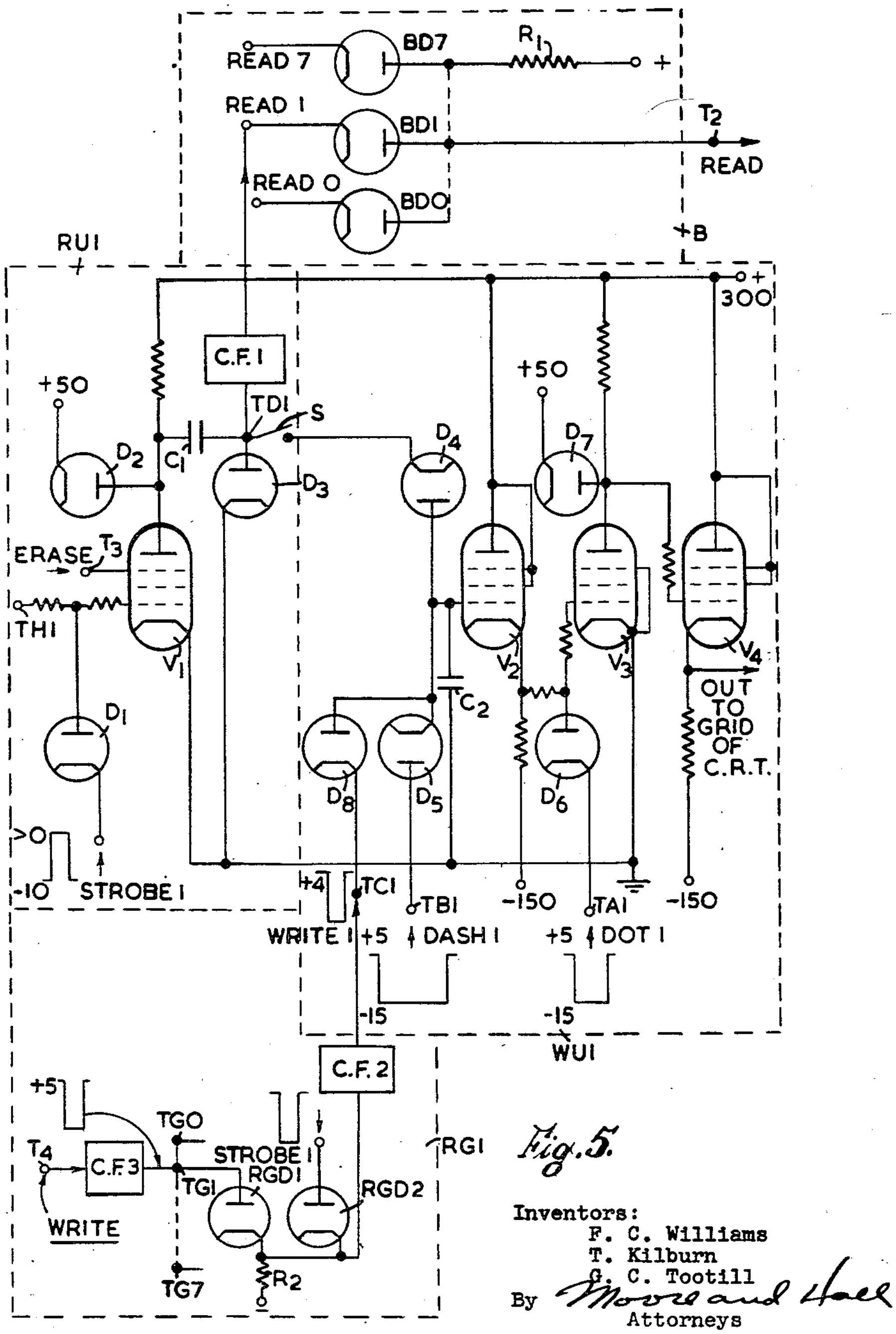
Figure 5 is a circuit diagram of one form that the buffer circuit, read units, writing gates and writing units of Figure 1 may take.

The waveform *b, c* and *d* are counter 0, 1 and 2 waveforms derived by frequency division from the clock waveform *a*. The strobe waveforms *e, f* . . . *g* can obviously be derived by the application of the waveform *a* and suitable ones of the waveforms *b, c* and *d* to a conventional "and" gate circuit such as has already been referred to. A suitable type of "and" gate circuit is shown in Figure 5 at RG1 and comprises two diodes RGD1 and RGD2 having their cathodes connected to a point of negative potential through a high resistance $R_2$ and having the input pulses applied in a negative sense from a low impedance source to the anodes. The output may be taken through a cathode follower CF2. The effect of the "and" gate is that an output pulse is produced only when pulses appear simultaneously at the input terminals. The number of input terminals, and hence of diodes, is made equal to the number of input pulses; in the case of generating the strobe pulses the number required is four.

By way of example, the strobe 0 waveform can be produced from *a* with *b, c* and *d*; the strobe 1 waveform *f* is produced from *a* with *b* reversed in sign and *c* and *d*; the strobe 7 waveform *g* is produced from *a* with the three waveforms *b, c* and *d* reversed in sign.

Figure 3:
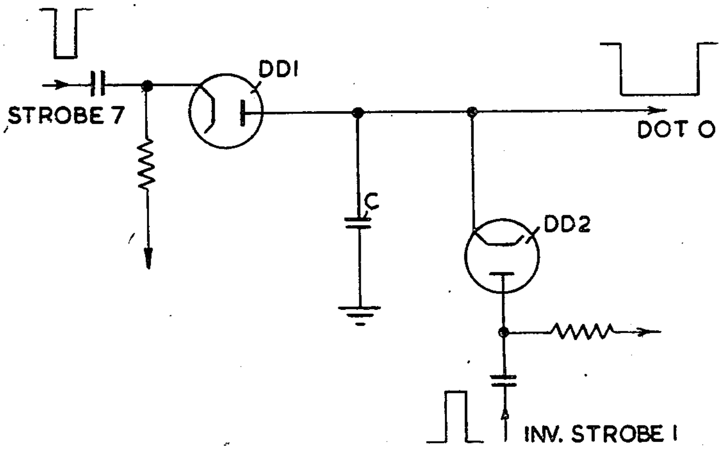

The dot waveforms such as *h* and *k* may be obtained from the strobe waveforms by means of a circuit such as is shown in Figure 3 which is adapted to generate the dot 0 waveform *h*. A capacitor C is arranged to be charged through a diode DD1 by each negative-going strobe 7 pulse *g*. The negative charge is held until the capacitor C is discharged by a positive-going strobe 1 pulse, which is the waveform *f* reversed in sign, through a diode DD2. The output pulse obtained at the cathode of DD2 is negative-going beginning at the front edge of the pulse *g* and ending with the front edge of the strobe 1 pulse.

Figure 4:
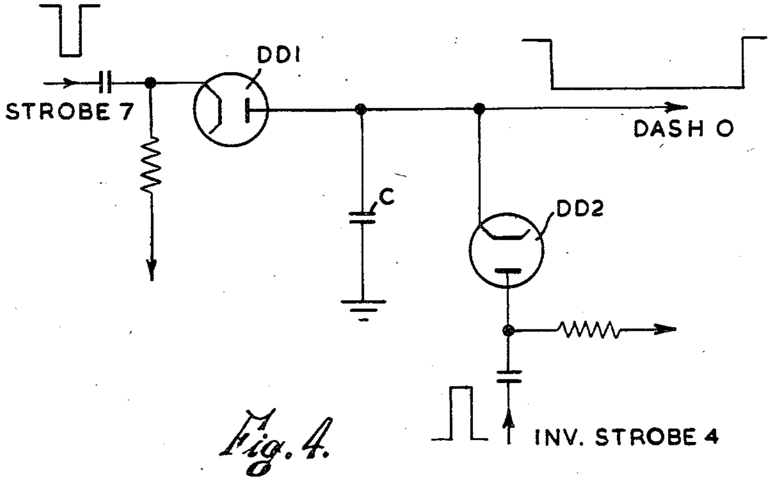

The dash waveforms such as at *j* and *l* are obtained with the same circuit, but different input pulses. Figure 4 shows the circuit for generating dash 0 pulses *j*, the capacitor C being charged by strobe 7 pulses *g* and discharged by strobe 4 pulses in positive-going sense.

From Figures 1 and 2 it can be seen that the various waveforms employed in the eight different storage devices are like but are displaced in phase relatively to one another, in this example by one microsecond. There is overlap in time between dot and dash pulses used in different devices but the strobe pulses associated with the different devices which determine the time intervals allotted to the reading of information and to the control of the writing of new information occupy distinct and non-overlapping time intervals. Thus eight microseconds is allotted to the storage of each digit but only one-half microsecond is allotted to the dynamic representation of each digit.

The time allotted to the reading of the information upon each digit recording area of each storage device and to the control of the writing of new information into each recording area is determined by strobe pulses applied to the reading units RU0, RU1, etc. and the writing gates RG0, RG1, etc.

One form that may be taken by the parts B, RU1, RG1, WU1 of Figure 1 is shown in Figure 5. This closely resembles the circuit shown in the previously-mentioned paper and has been modified to adapt it for use with a number of storage devices. The particular reading unit circuits and writing gate shown are RU1 and RG1, namely those for the storage device 1 (embodying CRT1) of Figure 1. Like circuits are provided for the other storage devices. The part of circuit B shown in detail in Figure 5 is that for devices D, 1 and 7, five more diodes being required for the remaining five storage devices.

In the absence of a write signal at TC1, dot pulses of waveform *k* are fed from TA1 to the grid of the cathode ray tube CRT1 to give a standard display of dots, or "0s", and these pulses are extended by dash pulses, of waveform *l*, applied at TB1, to be of dash length. Thus a dash or "1" is written into the cathode ray tube store only if a positive pulse is applied from the amplifier AMP1 connected to the signal plate PU1 to RU1 and thence from TD1 to TC1 in Figure 1 by a connection, not shown, or along the equivalent path through switch S in Figure 5, or alternatively if an appropriate writing signal is applied to TC1 from an external source. In Figure 5, the standard dot waveform *k* at terminal TA1 is fed to the cathode of a diode $D_6$, the dot pulse being 20 volts negative-going from a resting level of +5 volts. The dot pulses cut off the control grid of a valve $V_3$, and the voltage at the anode of $V_3$, which was previously at its lowest value due to conduction of the valve, rises quickly until caught by a diode $D_7$ at approximately +50 volts. The resulting positive pulse at the anode of $V_3$ is fed to the grid of CRT1 through a cathode follower $V_4$. Blackout of the cathode ray tube during the return strokes between the sweeps which cause exploration in the line (X) direction may be obtained by providing that the dot waveforms are inhibited at their sources during the time-base blackout periods. The dash and strobe pulses may be similarly inhibited.

The valves $V_1$ and $V_2$ and their associated diodes form the true gate circuit. The output from the amplifier AMP1 of Figure 1, appearing at terminal TH1, about a resting level of −15 volts, is fed to the grid of $V_1$ only during the relevant strobe interval when a diode $D_1$ is cut off by the strobe 1 (waveform *f*) pulse, which is fed, in positive-going sense, from a resting level of −10 volts, to its cathode. $V_1$ is normally cut off and coincidence of a positive signal from the amplifier and a positive strobe 1 pulse causes the valve to conduct for the duration of the strobe pulse, producing a corresponding negative pulse from the resting level of +50 volts defined by a diode $D_2$. This negative pulse has a duration (determined by the strobe pulse) of approximately ½ microsecond and is provided by a capacitor $C_1$ and diode $D_3$ with a resting level of approximately zero at the terminal TD1 where it forms the "read" output. The read 1 pulse (waveform 0) is fed through a cathode follower CF1 to the buffer device B of Figure 1, which, as shown in Figure 5, comprises diodes BD0—BD7 arranged in known fashion together with a resistor $R_1$ to provide an output voltage at $T_2$. Only three of these diodes are shown. The negative pulses at TD1, when the switch S is closed, are also applied through a diode $D_4$ to a cathode follower valve $V_2$. The upper voltage limit of the control grid of $V_2$ is defined at approximately zero volts by conduction of diodes $D_3$ and $D_4$ and the lower voltage limit is defined at −15 volts by conduction of diode $D_5$, to the anode of which is fed the dash 1 waveform *l* the pulses of which are arranged to be 20 volts negative-going from a resting level of +5 volts. A capacitor $C_2$ prevents the grid potential of $V_2$ changing rapidly unless it is driven. When a negative read 1 pulse occurs at the anode of $V_1$ the grid potential of $V_2$ is driven rapidly to −15 volts and remains at that level until the termination of the dash 1 pulse which drives the grid potential back to zero. The corresponding swing in the cathode voltage of $V_2$ will be, say, between +3 and −12 volts which is adequate to cause full anode current or no anode current respectively in $V_3$. The result is that, on the occurrence of a positive signal on the grid of $V_1$ during a strobe pulse the dot output pulse which would otherwise be delivered by $V_4$ is extended into a dash pulse.

When the circuit of Figure 5 is connected in the manner shown in Figure 1, that is with terminal $T_2$ connected to terminal $T_4$ through the adder, the switch S of Figure 5 is open. When no signal is applied at $T_1$ and when therefore no change in the recorded information is required, the circuit AD passes to RG1 whatever appears from the buffer B at the times determined by the strobe 1 pulses. The behaviour of the storage device including CRT1 is then the same as if the switch S in Figure 5 were closed. If on the other hand the information applied at $T_1$ is such that a change in the digit recorded is required, the appropriate signal is applied from AD to RG1.

The pulses required at terminal TC1 when a dash is be written are generated in the writing gate RG1 which comprises two diodes RGD1 and RGD2 which, together with a resistor $R_2$ returned to a negative potential source, constitute as already described a conventional "and" gate for negative pulses. A cathode follower CF2 is preferably inserted in the connection from the output of the gate RG1 to the terminal TC1 and thus to the cathode of diode $D_8$. The anode of diode RGD2 is fed with the strobe 1 pulses in negative-going sense while the anode of RGD1 is fed in parallel with the anodes of the corresponding diodes of the writing gates RGO etc. of the other storage devices, from the common "write" terminal $T_1$ through a cathode follower CF3.

When it is required to write new information into the store from an external source, such new information may be applied to terminal $T_1$, the loop circuit being broken by applying a suitable negative voltage at an erase terminal $T_3$ in Figure 5 to cut off the valve $V_1$. If there is no connection between $T_2$ and $T_4$ the loop circuit can be broken by opening the switch S. An erase voltage is not then required.

It will be apparent that while each storage device may operate in general in the normal manner described in the patent specifications or paper referred to previously, the reading units RU0, RU1, etc. may be so arranged that the read output provided for a "1" digit comprises a pulse coincident with and of the same length as the corresponding strobe pulse, and that such a ½-microsecond pulse may activate the corresponding writing unit WU0, etc. to cause a "1" digit (dash) to be written into the storage device in the known manner. The reading signals derived from the devices and the writing signals required to control the writing or regeneration functions of the devices will thus all be interlaced in time and may be handled in a common channel and can be accepted from or assigned to each individual device on a time division basis. By way of example the read 0, read 1 and read 6 outputs corresponding to "1" digits are indicated in Figure 2(*m*), (*o*) and (*p*) while Figure 2(*q*) represents the combined "read" output which would be obtained from the buffer device B fed with all the read output, all the read 2, 3, 4, 5 and 7 outputs as shown in Figure 2(*n*) being zero.

Although the system described by way of example employs eight separate cathode ray tube storage devices operating in interlaced relationship and operates with a digit recurrence period in the external circuits between the buffer B and terminal $T_4$ which is one eighth of the digit recurrence period in any one of the devices, the invention is of course not limited to a system in which normal length digital numbers ("words") are divided between eight devices working in interlaced relationship. Any desired number of separate storage devices may be operated in interlaced fashion in accordance with the invention so long as the digit recurrence periods in the individual devices and in the external circuits are so selected that the full cycle of events including the reading and writing of an individual digit in any one of the devices can be completed before access to the next digit in the same device is demanded by the external apparatus operating at the external digit repetition frequency.

When the data on any one storage device is recorded upon a raster pattern of recording lines, a single line across the face of the cathode ray tube may accommodate as many as 40 to 80 digits, while during the time occupied in handling a single 40-digit "word" only a small number of digits, say 5, must be scanned on each cathode ray tube. It is convenient therefore to arrange that the raster on each tube is divided into an appropriate number of columns and that the line deflection covers only a single column, the desired column being selected by a suitable shift voltage. Thus with any given shift voltage applied to the X plates, the beam scans a raster of lines each containing only say 5 digits, such raster constituting one column, and the column scanned can be changed by changing the value of the shift voltage.

Amongst variations that may be made in the waveforms shown in Figure 2 are the durations of dot, dash and strobe pulses and their repetition period. The strobe pulse may be arranged to occur at any convenient time during a dot pulse so long as the strobe pulses associated with different tubes do not overlap in time.

The strobe pulses fed to RU0, RU1, etc. need not be coincident in time with those fed to RG0, RG1, etc. Thus there may be two groups of interlaced pulses, one group being fed to RU0, RU1, etc. and the other to RG0, RG1, etc. It may, for example, be found desirable to arrange that the pulses fed to RG0, RG1, etc. occur slightly later than those fed to RU0, RU1, etc. While it must be arranged that there is no overlap in time between strobe pulses of each group, the pulses in the different groups may overlap in time.

We claim:

1. Apparatus for the storage of digital information comprising a plurality of cathode ray tubes, each having an electron gun and a storage screen, a pick-up plate coupled electrostatically to said screen, and control means coupled to said electron gun to control the bombardment of the storage screen by the cathode ray beam, loop circuits linking the pick-up plates and control means of each said tube and passing voltages from said pick-up plates to control said control means, said loop circuits having a portion common to all, and means allocating said common portion to the different loop circuits in succession.

2. Apparatus according to claim 1, wherein said allocating means comprise means for generating a train of strobe pulses for each of said tubes, the pulses of the different trains being respectively in interlaced relation, and means to apply said strobe pulses to control the passage of signals in the respective loop circuits.

3. Apparatus according to claim 1, comprising pulse producing means coupled to the said control means to increase the beam intensity of each tube, the pulses applied to the control means of one tube overlapping in time the pulses applied to the control means of another tube.

4. The apparatus of claim 1 in which each of said loop circuits includes an "and" gate circuit having two inputs, said allocating means being coupled to one of said inputs and comprising means generating a train of pulses, the pulses of the different trains being respectively interlaced in time.

5. Apparatus for the storage of digital information comprising a plurality of storage devices, each such storage device including a cathode ray tube, each said tube comprising an electric charge-retaining surface, means to direct the cathode ray beam towards discrete areas of said surface during successive time intervals respectively, first control means to increase the intensity of said beam during an early part of each said time interval, second control means to increase the intensity of said beam during a later part of each said time interval, further control means to render said second control means operative and inoperative in response to control voltages representative of information to be stored, and a pick-up plate coupled to said surface to generate output voltages corresponding to changes in charge of said areas, said apparatus also comprising a writing circuit constituting a source of said control voltages, and means coupling said writing circuit to each of said further control means, each of said coupling means including means confining said control voltages to short periods of time, and the said periods of time for the different storage devices being interlaced with one another and occurring during said time intervals.

6. Apparatus according to claim 5, wherein the said periods of time for each storage device are shorter than and within said early part of said time interval for such storage device.

7. Apparatus according to claim 5, including means coupling each of said pick-up plates to said writing circuit to control the generation of said control voltages.

8. Apparatus according to claim 5, including a reading circuit, and means coupling each of said pick-up plates to said reading circuit, each of the last said coupling means including means confining said output voltages to short periods of time, and the said periods of time for the different storage devices being interlaced with one another.

9. Apparatus according to claim 5, wherein said writing circuit comprises a computing device having at least two inputs and an output, one of said inputs being coupled to each of said pick-up plates and said output being coupled to said further control means.

10. Apparatus for the storage of digital information comprising a plurality of storage devices, each such storage device including a cathode ray tube, each said tube comprising an electric charge-retaining surface, means to direct the cathode ray beam towards discrete areas of said surface during successive time intervals respectively, first control means to increase the intensity of said beam during an early part of each said time interval, second control means to increase the intensity of said beam during a later part of each said time interval, further control means to render said second control means operative and inoperative in response to control voltages representative of information to be stored, and a pick-up plate coupled to said surface to generate output voltages corresponding to changes in charge of said areas, said apparatus also comprising a reading circuit, and means coupling each said pick-up plate to said reading circuit, each said coupling means including means confining said output voltages to short periods of time, and the said periods of time for the different storage devices being interlaced with one another and occurring during said time intervals.

11. Apparatus according to claim 10, wherein the said periods of time for each storage device are within said early part of said time interval for such storage device.

12. Apparatus according to claim 10 comprising a computing device having at least two inputs and an output, one of said inputs being coupled to said reading circuit, and said output being coupled to each of said further control means.

References Cited in the file of this patent

UNITED STATES PATENTS

| | | |
|---|---|---|
| 2,401,729 | Goldsmith | June 11, 1946 |
| 2,435,840 | Morton | Feb. 10, 1948 |
| 2,459,131 | Mesner | Jan. 11, 1949 |
| 2,472,165 | Mankin | June 7, 1949 |
| 2,524,837 | Russell et al. | Oct. 10, 1950 |
| 2,589,460 | Tuller | Mar. 18, 1952 |

OTHER REFERENCES

Article by Williams and Kilburn in "Proceedings of IRE," volume 86, number 40, March 1949; pages 81 to 100.

"A Memory Tube," Andrew V. Hueff, Electronics, September 1947; pages 80 to 83.

"A Dynamically Regenerated Electrostatic Memory System," Eckert, Lukoff et al., IRE Proceedings, May 1950; pages 498 to 514.